United States Patent
Blessing et al.

(10) Patent No.: US 11,359,513 B2
(45) Date of Patent: Jun. 14, 2022

(54) TURBINE CASING AND METHOD FOR ASSEMBLING A TURBINE HAVING A TURBINE CASING

(71) Applicant: Siemens Energy Global GmbH & Co. KG, Munich (DE)

(72) Inventors: Alexander Blessing, Dresden (DE); Mario Rolle, Neisseaue (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/488,854

(22) PCT Filed: Dec. 1, 2017

(86) PCT No.: PCT/EP2017/081194
§ 371 (c)(1),
(2) Date: Aug. 26, 2019

(87) PCT Pub. No.: WO2018/157957
PCT Pub. Date: Sep. 7, 2018

(65) Prior Publication Data
US 2019/0383171 A1    Dec. 19, 2019

(30) Foreign Application Priority Data
Feb. 28, 2017    (DE) .................... 10 2017 203 210.3

(51) Int. Cl.
*F01D 25/24*      (2006.01)
*F01D 25/28*      (2006.01)
(Continued)

(52) U.S. Cl.
CPC ............ *F01D 25/243* (2013.01); *F01D 25/28* (2013.01); *F05D 2220/31* (2013.01);
(Continued)

(58) Field of Classification Search
CPC ...... F01D 25/243; F01D 25/28; F01D 25/246; F01D 11/005; F01D 25/24; F01D 11/003;
(Continued)

(56) References Cited

U.S. PATENT DOCUMENTS 8,419,357 B2    4/2013   Haje
9,856,753 B2    1/2018   Chow et al.
(Continued)

FOREIGN PATENT DOCUMENTS

CN    102317580 A    1/2012
CN    202707231 U    1/2013
(Continued)

OTHER PUBLICATIONS

Machine Translation of EP 2915960 A1 [retrieved on Mar. 19, 2021], Retrieved from: Espacenet. (Year: 2021).*
(Continued)

*Primary Examiner* — Eric J Zamora Alvarez

(57) ABSTRACT

A turbine casing has a front casing segment around a turbine longitudinal axis with first and second front casing part-segments, and a rear casing segment, around the longitudinal axis with first and second rear casing part-segments. The rear casing segment is downstream of the front casing segment in the direction of flow and fastened to the front casing segment via a rear vertical flange of the rear casing segment and a front vertical flange of the front casing segment, forming a cross-shaped joint. A protrusion surrounding the longitudinal axis is formed on the front casing segment in a region of the front vertical flange and extends parallel to the longitudinal axis and protrudes from the front vertical flange in the flow direction. A circumferential seal device is on an outer side, facing away from the longitudinal axis, of the protrusion, and seals the protrusion against the rear casing segment.

9 Claims, 3 Drawing Sheets

(51) Int. Cl.
*F01D 11/00* (2006.01)
*F02C 7/28* (2006.01)

(52) U.S. Cl.
CPC ...... *F05D 2230/60* (2013.01); *F05D 2240/14* (2013.01); *F05D 2240/55* (2013.01)

(58) Field of Classification Search
CPC .......... F01D 25/26; F01D 11/00; F01D 11/04; F01D 11/025; F01D 25/183; F01D 25/265; F05D 2220/32; F05D 2220/31; F05D 2230/60; F05D 2240/14; F05D 2240/55; F04D 29/644; F01K 23/10; Y10T 29/492497
See application file for complete search history.

(56) References Cited

U.S. PATENT DOCUMENTS

| | | |
|---|---|---|
| 2007/0160471 A1 | 7/2007 | Welch |
| 2011/0164965 A1* | 7/2011 | Smith .................. F01D 11/005 415/182.1 |
| 2011/0176918 A1 | 7/2011 | Otani et al. |
| 2014/0035240 A1* | 2/2014 | Sha ...................... F01D 11/003 277/641 |
| 2016/0018662 A1 | 1/2016 | Wang |
| 2016/0186612 A1 | 6/2016 | Anga et al. |
| 2016/0341043 A1 | 11/2016 | Li et al. |

FOREIGN PATENT DOCUMENTS

| | | | |
|---|---|---|---|
| CN | 106103905 A | 11/2016 | |
| DE | 102008045657 A1 | 3/2010 | |
| EP | 2488726 A1 | 8/2012 | |
| EP | 2915960 A1 * | 9/2015 | .......... F16J 15/0887 |
| EP | 3059400 A1 | 8/2016 | |
| EP | 3103972 A1 | 12/2016 | |
| JP | S5996305 U | 6/1984 | |
| JP | S60147856 U | 10/1985 | |
| JP | 2007187151 A | 7/2007 | |
| JP | 2010174795 A | 8/2010 | |
| JP | 2016125485 A | 7/2016 | |
| WO | 2011045127 A1 | 4/2011 | |
| WO | 2016082956 A1 | 6/2016 | |

OTHER PUBLICATIONS

International search report and written opinion dated Jul. 6, 2018, for corresponding PCT/EP2017/081194.
Trutnovsky Karl: "Berührungsdichtungen an ruhenden und bewegten Maschinenteilen"; 2. Auflage. Berlin, Heidelberg : Springer-Verlag 1975 pp. 75-93; 210-217; ISBN 978-3-662-00938-3; 1975; "Contact seals on stationary and moving Machine Parts", 2nd edition, Berlin, Heidelberg: Springer-Verlag 1975 pp. 75-93; 210-217; ISBN 978-3-662-00938-3; 1975; [concise explanation of the relevancy attached].
PCT International Search Report and Written Opinion of International Authority dated Jul. 6, 2018 corresponding to PCT International Application No. PCT/EP2017/081194 filed Dec. 1, 2017 (previously provided).

* cited by examiner

TURBINE CASING AND METHOD FOR ASSEMBLING A TURBINE HAVING A TURBINE CASING

CROSS REFERENCE TO RELATED APPLICATIONS

This application is the US National Stage of International Application No. PCT/EP2017/081194 filed 1 Dec. 2017, and claims the benefit thereof. The International Application claims the benefit of German Application No. DE 10 2017 203 210.3 filed 28 Feb. 2017. All of the applications are incorporated by reference herein in their entirety.

FIELD OF INVENTION

The present invention relates to a multiple-part turbine casing, in particular for a steam turbine, as well as to a method for assembling a multiple-part turbine casing, in particular for a steam turbine.

BACKGROUND OF INVENTION

Steam turbines are turbo machines which are configured for converting the enthalpy of steam to kinetic energy. Conventional steam turbines have a turbine casing which surrounds a flow chamber for the steam to flow through. A rotatably mounted turbine shaft having a multiplicity of rotor blades which in the form of rotor blade rings disposed behind one another are held on the turbine shaft is disposed in the flow chamber. In order for the incident flow of steam on the rotor blades to be optimized, steam turbines have guide vane rings which are in each case disposed upstream of a rotor blade ring and are held on the turbine casing. A group from a guide vane ring having an associated rotor blade ring is also referred to as a turbine stage.

The steam when flowing through the steam turbine releases part of the inherent energy thereof which by way of the rotor blades is converted to a rotating energy of the turbine shaft. A relaxation of the steam takes place herein such that the pressure and the temperature of the steam when flowing through the steam turbine are reduced after each turbine stage. The turbine casing is thus exposed to a temperature gradient between a steam inlet and a steam outlet. In particular in the case of steam turbines of compact construction, this leads to a very high stress on the turbine casing.

In order for the efficiency to be improved, steam turbines in special embodiments have a plurality of turbine sections such as, for example, a high-pressure section, a medium-pressure section, and/or a low-pressure section. In order for the efficiency to be further improved, steam turbines of this type can have a heating device for the intermediate superheating of the steam so that steam that exits the high-pressure section can be heated by the heating device, for example, before said steam is fed to the downstream turbine sections. It can be provided herein that a heating device of such type is in each case disposed between two turbine sections. Intense temperature variations along a turbine longitudinal axis of the steam turbine arise in particular in the case of steam turbines having such intermediate superheating of the steam. Initially, the temperature in the high-pressure section drops in a gradual manner, then abruptly rising in the transition region by virtue of the intermediate superheating. A region of the turbine casing which is disposed so as to be adjacent to an outflow of the high-pressure section or adjacent to an incident flow of the subsequent medium-pressure section or low-pressure section is exposed to particularly intense temperature differentials in particular in the case of steam turbines of compact construction.

For reasons of better production and assembly, turbine casings moreover have a plurality of casing parts which while configuring joints are connected to one another so as to form the turbine casing. Turbine casings herein often have a casing lower part as well as a casing upper part. The turbine casing can also have a plurality of casing segments along the turbine longitudinal axis such that the high-pressure section and the medium-pressure section are disposed in different casing segments, for example. The connection is often performed by screw-fitting vertical flanges, thus flanges of the casing parts or casing segments, respectively, wherein the flanges extend in an annular manner on a plane that is transverse to the turbine longitudinal axis.

In the case of turbine casings which, for example, have at least one front casing segment having a first front casing sub-segment and a second front casing sub-segment as well as a rear casing segment having a first rear casing sub-segment and a second rear casing sub-segment, a split cross joint is configured at an abutment location between four casing sub-segments. Vertical flanges and horizontal flanges meet at split cross joints of turbine casings. Guaranteeing a high steam tightness is particularly problematic at such split cross joints. A risk of leakage associated with suctioning ambient air into the casing, or leaking of the operating medium, respectively, at a split cross joint is being increased on account of high temperatures stresses such as, for example, temperature variations, temperature gradients, or extreme temperatures, as well as on account of high compressive loads such as, for example, pressure variations, pressure gradients, or extreme pressures. The risk of leakages at split cross joints is particularly increased in particular by way of high excessive pressures.

There are several different approaches in terms of solutions in order for leakages at split cross joints to be avoided. A tightness at split cross joints can be improved by increasing a screw force for connecting the flanges of adjacent casing sub-segments and by using oversized components. An increased complexity in terms of material and assembly and thus increased production costs of the turbine casing are disadvantageous herein. Alternatively or additionally, operating parameters can be restricted in such a manner that critical limit values which would lead to excessive stress on the split cross joints are avoided. An output and often also an efficiency of the turbine are reduced on account of said measure.

SUMMARY OF INVENTION

It is therefore an object of the present invention to achieve a turbine casing for a turbine as well as a method for assembling a turbine having a turbine casing according to the invention, said turbine casing and said method eliminating or at least partially eliminating the disadvantages of the prior art. It is in particular the object of the present invention to provide a turbine casing for a turbine, in particular a steam turbine, as well as a method for assembling a turbine, said turbine and said method guaranteeing with simple means and in a cost-effective manner an improved tightness at split cross joints.

The object mentioned above is achieved by the patent claims. Accordingly, the object is achieved by a turbine casing for a turbine, in particular a steam turbine, as claimed. The object mentioned above is furthermore achieved by a method for assembling a turbine, in particular a steam turbine, having a turbine casing according to the invention as claimed. Further features and details of the invention are derived from the dependent claims, the description, and the drawings. Features and details herein which are described in the context of the turbine casing according to the invention, of course also apply in the context of the method according to the invention, and vice versa, so that in terms of the disclosure reference at all times is made, or can be made, respectively, in a reciprocating manner to the individual aspects of the invention.

According to a first aspect of the invention, the object is achieved by a turbine casing for a turbine, in particular a steam turbine. The turbine casing has a front casing segment, configured about a turbine longitudinal axis, having a first front casing sub-segment as well as the second front casing sub-segment, and a rear casing segment, configured about the turbine longitudinal axis, having a first rear casing sub-segment as well as a second rear casing sub-segment. The rear casing segment in the flow direction of the turbine is disposed behind the front casing segment as well as, while configuring a split cross joint, by way of a rear vertical flange of the rear casing segment is fastened to a front vertical flange of the front casing segment on the front casing segment. According to the invention, a protrusion that on the front casing segment surrounds the turbine longitudinal axis is configured in a region of the front vertical flange, said protrusion extending parallel or at least substantially parallel to the turbine longitudinal axis and in the flow direction protruding beyond the front vertical flange. An encircling sealing device which seals the protrusion in relation to the rear casing segment is disposed on an external side of the protrusion that faces away from the turbine longitudinal axis.

The front casing segment and the rear casing segment are configured about the turbine longitudinal axis on which a rotor shaft of the turbine having rotor blade rings is advantageously capable of being coaxially disposed. Assembling and dismantling the rotor shaft as well as further components of the turbine such as, for example, bearings, seals, guide vane rings, or the like, is improved or guaranteed, respectively, by dividing the turbine casing into casing segments, and the turbine casing can be produced and transported in a more cost-effective manner. The turbine longitudinal axis is advantageously configured on a horizontal plane.

The front casing segment has a front horizontal flange which extends parallel or at least substantially parallel, respectively, to the turbine longitudinal axis. The front horizontal flange is partially configured on the first front casing sub-segment as well as partially on the second front casing sub-segment. The first front casing sub-segment and the second front casing sup-segment are connected to one another, in particular by means of screws, bolts, or the like, by way of the front horizontal flange. The rear casing segment has a rear horizontal flange which extends parallel or at least substantially parallel, respectively, to the turbine longitudinal axis. The rear horizontal flange is partially configured on the first rear casing sub-segment as well as partially on the second rear casing sub-segment. The first rear casing sub-segment and the second rear casing sub-segment are connected to one another, in particular by means of screws, bolts, or the like, by way of the rear horizontal flange. A horizontal flange in the context of the invention is understood to be a flange which extends on a plane on which the turbine longitudinal axis runs or to which the turbine longitudinal axis runs so as to be at least parallel. Said plane is advantageously horizontally aligned but, depending on the embodiment of the turbine, can nevertheless have an inclination between 0° and 90° in relation to the horizontal plane.

The front casing segment has a front vertical flange which faces the rear casing segment as well as is adjacent to the latter, and in terms of the flow direction extends in the radial direction. The front vertical flange is partially configured on the first front casing sub-segment as well as partially on the second front casing sub-segment. Accordingly, the rear casing segment has a rear vertical flange which faces the front casing segment as well as is adjacent to the latter, and in terms of the flow direction extends in the radial direction. The rear vertical flange is partially configured on the first rear casing sub-segment as well as partially on the second rear casing sub-segment. The front casing segment is connected to the rear casing segment, in particular by means of screws, bolts, or the like, by way of the front vertical flange and the rear vertical flange. A vertical flange in the context of the invention is a flange which extends on a plane which is advantageously configured so as to be perpendicular to the turbine longitudinal axis. Depending on the embodiment, it can be provided that said plane runs about an axis which runs horizontally as well as transversely to the turbine longitudinal axis in order to be inclined between 0° and 90°.

The protrusion is advantageously configured as an extension of the front casing sub-segment, said extension protruding beyond the front vertical flange in the flow direction. A wall thickness of the protrusion is advantageously configured so as to be less than a wall thickness, or mean wall thickness, respectively, of the front casing sub-segment. This has the advantage that a direct incident flow onto a separating joint between the front vertical flange and the rear vertical flange by way of an operating fluid of the turbine that flows in the flow direction, or substantially in the flow direction, is capable of being prevented in this way. The external side of the protrusion faces away from the turbine longitudinal axis as well as in the radial direction is surrounded by the rear casing segment.

The sealing device disposed on the external side completely surrounds the turbine longitudinal axis. The sealing device closes a gap which is configured between the protrusion and the rear casing segment and thus seals a turbine casing interior in relation to the split cross joint. A region of the sealing device is advantageously configured according to a known piston seal. In the context of the invention it can be provided that the sealing device is fixed to the protrusion or to the rear casing segment.

A fastening pitch circle diameter is advantageously configured so as to be larger than a protrusion external diameter of the protrusion. The connecting locations of the front vertical flange to the rear vertical flange are thus covered in relation to the turbine casing interior on account of the protrusion.

A turbine casing according to the invention as compared to conventional turbine casings has the advantage that said turbine casing according to the invention, in particular by virtue of the protrusion as well as the seal assembly has a particularly reliable or high level of, respectively, tightness at the split cross joint. A further advantage is that the turbine casing according to the invention is particularly suitable for small and/or compact turbines, and is capable of being conceived for comparatively extreme operating parameters, in particular high excessive pressures as well as high temperatures.

According to one refinement of the invention it can be provided in the case of a turbine casing that the protrusion is configured so as to be hollow-cylindrical, or substantially hollow-cylindrical, respectively, or hollow-conical, or substantially hollow-conical, respectively. A protrusion of this type has an annular cross section. In the case of a hollow-conical protrusion, the cone is advantageously configured on the external side as an external cone. The external cone herein is advantageously configured in such a manner that a compressive force which is capable of being transmitted by way of the sealing device can be built up by way of the external cone when joining the front casing segment to the rear casing segment. Furthermore advantageously, an internal cone which when joining the front casing segment to the rear casing segment can be brought to engage with the external cone is configured on an internal side of the rear casing segment. A tightness of the turbine casing is capable of being further improved with simple means in this way. A protrusion according to the invention moreover has the advantage that a contact joint between the front vertical flange and the rear vertical flange is covered in a fully circumferential manner, or substantially fully circumferential manner, respectively.

Furthermore advantageously, the sealing device is disposed and configured in such a manner so as to seal the protrusion in relation to the rear vertical flange. The protrusion and the rear vertical flange thus form a common overlap region. It is advantageous herein that the protrusion completely, or at least substantially completely, respectively, overlaps the rear vertical flange. Alternatively, it can be provided that the protrusion partially overlaps the rear vertical flange or protrudes beyond the latter in the flow direction. A disposal of the sealing device of this type has the advantage that, by virtue of a particularly high stability of the rear casing segment in the region of the rear vertical flange, a particularly positive sealing effect is thus achievable.

At least one encircling groove is advantageously configured in the external side of the protrusion. The sealing device has at least one seal ring which has at least one first ring segment and one second ring segment. The at least one seal ring is at least partially received in the at least one groove and in a sealing manner contacts the rear casing segment in the radial direction in terms of the turbine longitudinal axis. In the context of the invention it can be provided that the at least one groove is configured on the internal side of the rear casing segment, and the seal ring is at least partially received in the at least one groove and in a sealing manner contacts the external side of the protrusion. Alternatively, the external side of the protrusion and the internal side of the rear casing segment can have in each case at least one groove in which the sealing device is at least partially disposed and thus is disposed in a sealing manner on the protrusion as well as the rear casing segment. A plurality of grooves having a plurality of seal rings can be provided for improving the tightness. A groove has the advantage that the sealing device with simple means and in a cost-effective manner is capable of being secured in relation to axial displacement along the turbine longitudinal axis. An improved sealing effect is furthermore achievable by means of a groove.

It is furthermore advantageous that the at least one first ring segment and the at least one second ring segment for configuring a gas-tight joint have end regions that at least partially mutually overlap in the circumferential direction, said end regions advantageously being configured according to conventional piston rings. Overlapping end regions have the advantage that an optimal sealing effect is achievable and diameter variations can be equalized by way of a higher pressure on the one side than on the other side, when viewed along the turbine longitudinal axis.

It can be provided according to the invention that at least one end region of the at least one first ring segment has at least one recess that is configured in the circumferential direction, and that at least one second end region of the at least one second ring segment has at least one tongue that projects in the circumferential direction, wherein the at least one tongue is configured for engaging in a form-fitting manner in the at least one recess. The end regions are advantageously configured in such a manner that form-fitting centering of the ring segments is performed when joining. Ring segments can be easily joined to one another so as to form a seal ring while configuring a positive seal by means of the configuration of this type.

It is advantageous that the at least one seal ring has a ring external diameter which at least in a de-stressed state is larger than a rear casing segment internal diameter of the rear casing segment. In the context of the invention, a de-stressed state of the ring is a state in which the ring is not urged. As soon as said ring is installed, said ring can be brought to a somewhat smaller diameter even when no operating fluid flows through the turbine and an internal pressure of the turbine corresponds to an ambient pressure. The oversize of the ring external diameter herein is such that assembling of the casing segments having the seal ring continues to be readily possible. By virtue of the larger diameter of the seal ring, said seal ring in the joint-together state of the casing segments forms a press-fit. On account thereof, a high tightness of the turbine casing is ensured.

In one advantageous design embodiment of the invention a bore which fluidically connects an intermediate space which is configured between the sealing device and the front vertical flange to a second interior region of the rear casing segment is configured in the rear vertical flange. The second interior region in the flow direction is disposed behind a first interior region within the rear casing segment that is directly adjacent to the front casing segment. Operating fluid that flows through the turbine thus first flows through the first interior region and subsequently flows further into the second interior region. The bore is advantageously configured in a wall of the rear casing sub-segment. Alternatively, a pipeline which fluidically connects the bore to the second interior region can also be disposed on the bore. A bore has the advantage that separating fluid that enters the intermediate space, thus operating fluid which has overcome the sealing device, is capable of being directed away from a sub-joint between the front vertical flange and the rear vertical flange as well as a sub-joint between the first horizontal flange and the second horizontal flange. Any unintentional suctioning of air into the rear casing segment can be avoided on account thereof.

Furthermore advantageously, the first front casing sub-segment is configured as a high-pressure turbine casing lower part of a high-pressure part of the turbine casing, the second front casing sub-segment is configured as a high-pressure turbine casing upper part of the high-pressure turbine casing, the first rear casing sub-segment is configured as an exhaust steam casing lower part of an exhaust steam casing of the turbine casing, and the second rear casing sub-segment is configured as an exhaust steam casing upper part of the exhaust steam casing. Conventional turbines have a division of the casing sub-segments of this type, since simple assembling or dismantling, respectively, as well as a reliable operation of the turbine are guaranteed on account of said division.

According to a second aspect of the invention, the object is achieved according to the invention by a method for assembling a turbine having a turbine casing according to the invention. The method comprises the following steps:—inserting the first ring segment of the seal ring into the groove of the protrusion of the high-pressure turbine casing lower part; —connecting the high-pressure turbine casing lower part to the exhaust steam casing lower part so as to form a casing lower part; —inserting interior components of the turbine into the casing lower part; —inserting the second ring segment of the seal ring into the groove of the protrusion of the high-pressure turbine casing upper part; —connecting the high-pressure turbine casing upper part to the exhaust steam casing upper part so as to form a casing upper part; and—depositing the casing upper part onto the casing lower part.

The first ring segment of the seal ring is inserted into the groove of the protrusion of the high-pressure turbine casing lower part and is secured against dropping out. The first ring segment is advantageously releasably fixed in the groove, in particular by means of a screw-fitting or adhesively bonding connection. The adhesively bonding connection advantageously has properties such that said adhesively bonding connection is released under temperature in the first operation of the turbine. Inserting is advantageously performed in such a manner that the end regions of the first ring segment are adjacent, in particular uniformly adjacent, to the horizontal flange of the high-pressure turbine casing lower part.

The high-pressure turbine casing lower part is subsequently connected to the exhaust steam casing lower part so as to form the casing lower part. The first ring segment herein is brought to engage with the exhaust steam casing lower part so as to produce a seal. Connecting, in particular by means of screws, bolts, or the like, is performed by way of the vertical flanges that are configured on the high-pressure turbine casing lower part as well as the exhaust steam casing lower part. It is advantageous that at least one centering bar is used when converging the high-pressure turbine casing lower part and the exhaust steam casing lower part, in order for the high-pressure turbine casing lower part and the exhaust steam casing lower part to be mutually aligned in an optimal manner. To this end, at least two centering bars are advantageously used.

Inserting the interior components of the turbine into the casing lower part is advantageously performed in such a manner that a rotor longitudinal axis is disposed on the turbine longitudinal axis. The interior components can be disposed on the high-pressure turbine casing lower part as well as on the exhaust steam casing lower part. It is advantageous according to the invention that at least part of the interior components is releasably fixed to the casing lower part.

The second ring segment of the seal ring is inserted into the groove of the protrusion of the high-pressure turbine casing upper part and is secured against dropping out. The second ring segment is advantageously releasably fixed in the groove, in particular by means of a screw-fit or adhesively bonding connection. The adhesively bonding connection advantageously has properties such that said adhesively bonding connection is released under temperature in the first operation of the turbine. Inserting is advantageously performed in such a manner that the end regions of the second ring segment are adjacent, in particular uniformly adjacent, to the horizontal flange of the high-pressure turbine casing upper part.

The high-pressure turbine casing upper part is subsequently connected to the exhaust steam casing upper part so as to form the casing upper part. The second ring segment herein is brought to engage with the exhaust steam casing upper part so as to produce a seal. Connecting, in particular by means of screws, bolts, or the like, is performed by way of the vertical flanges that are configured on the high-pressure turbine casing upper part as well as the exhaust steam casing upper part. It is advantageous that at least one centering bar is used when converging the high-pressure turbine casing upper part and the exhaust steam casing upper part, in order for the high-pressure turbine casing upper part and the exhaust steam casing upper part to be mutually aligned in an optimal manner. To this end, at least two centering bars are advantageously used.

In the following method step, the casing upper part is deposited onto the casing lower part and is releasably fixed to the latter. When depositing, the casing upper part and the casing lower part are aligned relative to one another, advantageously by means of at least one centering bar. To this end, at least two centering bars are advantageously used. Furthermore advantageously, the casing lower part is disposed in a positionally consistent manner such that only the casing upper part is moved when aligning and depositing.

The method according to the invention for assembling a turbine having a turbine casing according to the invention has the same advantages as has already been described above in the context of a turbine casing according to the first aspect of the invention. Accordingly, the method according to the invention has the advantage that a turbine having a turbine casing is capable of being assembled with simple means and in a cost-effective manner, said turbine casing in the region of the split cross joint of the turbine casing having a particularly high and reliable tightness. The method according to the invention is particularly suitable for assembling small and/or compact turbines which are capable of being operated under comparatively extreme operating parameters, in particular high excessive pressures as well as high temperatures, and herein have a high tightness.

BRIEF DESCRIPTION OF THE DRAWINGS

A turbine casing according to the invention as well as a method according to the invention will be explained in more detail hereunder by means of drawings in which, in each case in a schematic manner.

DETAILED DESCRIPTION OF INVENTION

Figure 1:
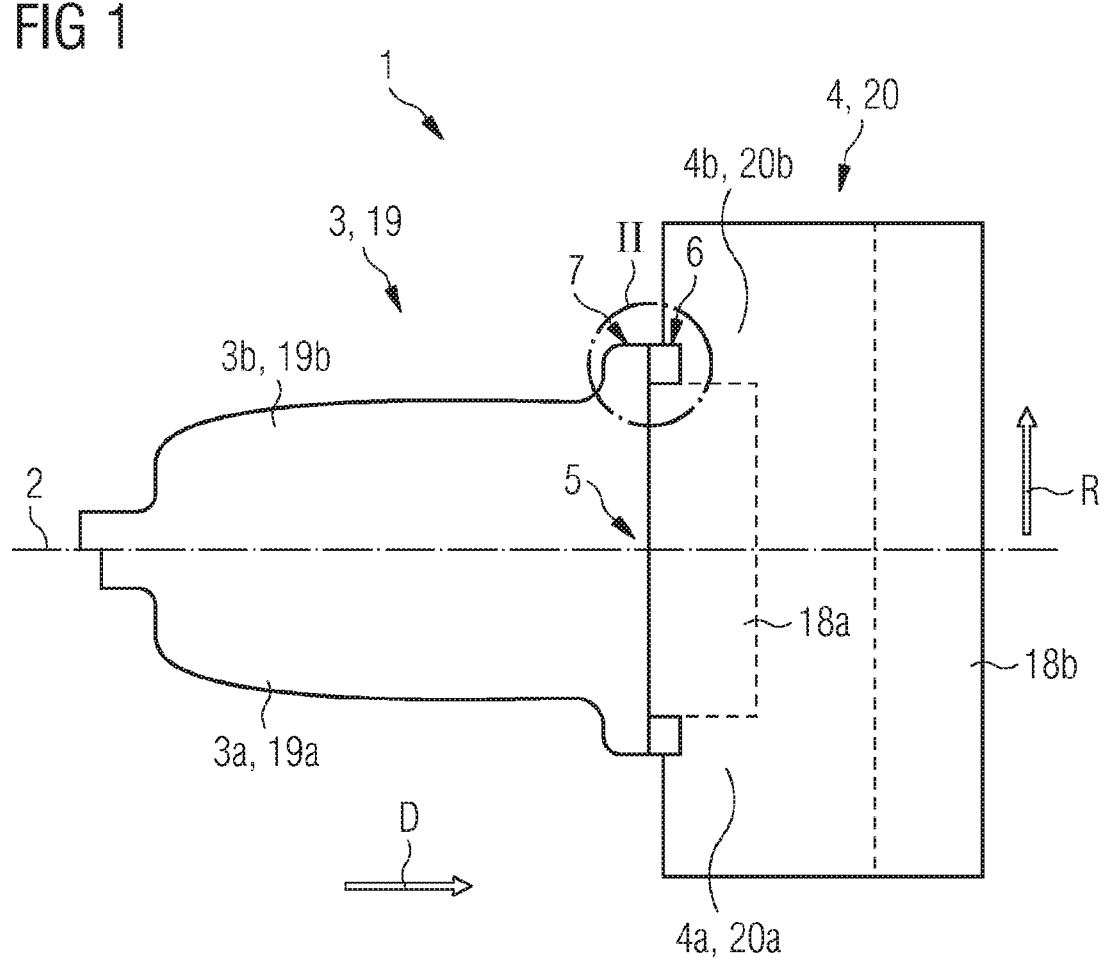
FIG. 1 in a lateral view shows a first embodiment of a turbine casing according to the invention.

A first embodiment of a turbine casing 1 according to the invention is schematically illustrated in a lateral view in FIG. 1. The turbine casing 1 extends along a turbine longitudinal axis 2 and has a front casing segment 3 configured as a high-pressure turbine casing 19 as well as a rear casing segment 4 configured as an exhaust steam casing 20. The rear casing segment 4 in the flow direction D of the turbine casing 1 is disposed behind the front casing segment 3. The front casing segment 3 has a first front casing sub-segment 3a, configured as a high-pressure turbine casing lower part 19a, as well as a second front casing sub-segment 3b, configured as a high-pressure turbine casing upper part 19b. The first front casing sub-segment 3a and the second front casing sub-segment 3b are releasably connected to one another by way of a horizontal flange (not illustrated) which is configured partially on the first front casing sub-segment 3a and partially on the second front casing sub-segment 3b. The rear casing segment 4 has a first rear casing sub-segment 4a, configured as an exhaust steam casing lower part 20a, as well as a second rear casing sub-segment 4b, configured as an exhaust steam casing upper part 20b. The first rear casing sub-segment 4a and the second rear casing sub-segment 4b are releasably connected to one another by way of a horizontal flange (not illustrated) which is configured partially on the first rear casing sub-segment 4a and partially on the second rear casing sub-segment 4b. The rear casing segment 4 has a first interior region 18a and a second interior region 18b, wherein the second interior region 18b in the flow direction D is disposed behind the first interior region 18a.

The front casing segment 3 at a rear end in the flow direction D has an encircling front vertical flange 7 which surrounds the turbine longitudinal axis 2 and advantageously has separating joints only in the region of the transitions between the first front casing sub-segment 3a and the second front casing sub-segment 3b. The rear casing segment 4 at a front end in the flow direction D has an encircling rear vertical flange 6 which surrounds the turbine longitudinal axis 2 and advantageously has separating joints only in the region of the transitions between the first rear casing sub-segment 4a and the second rear casing sub-segment 4b. A split cross joint 5 is configured in a region which is adjacent to the first front casing sub-segment 3a, the second front casing sub-segment 3b, the first rear casing sub-segment 4a, and the second rear casing sub-segment 4b.

Figure 2:
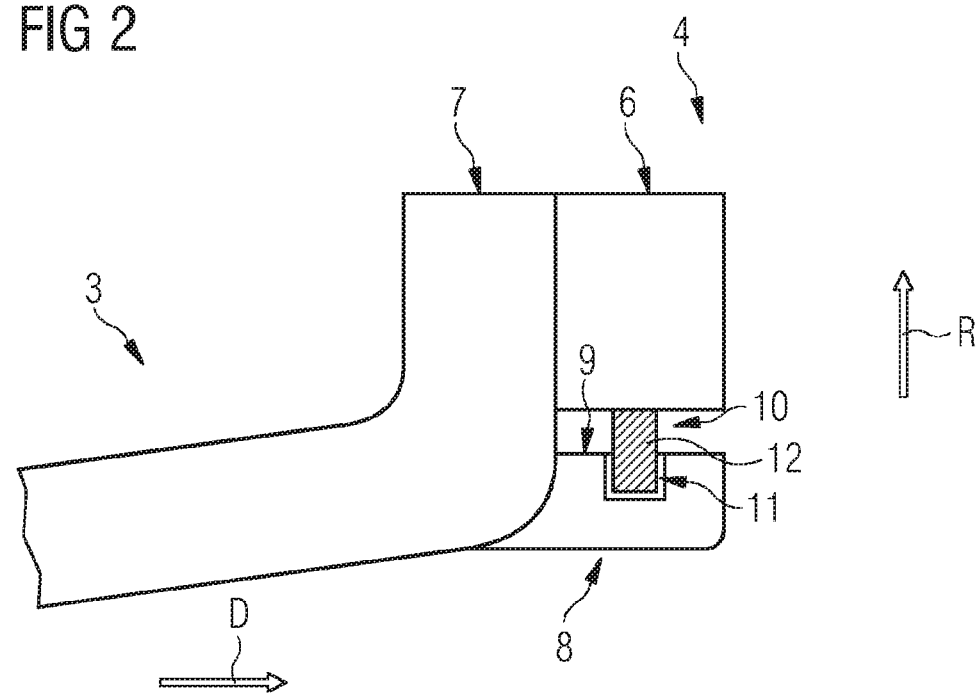
FIG. 2 in the longitudinal section shows an enlarged fragment of the turbine casing from FIG. 1.

An enlarged fragment of the turbine casing 1 from FIG. 1 is schematically illustrated in FIG. 2. It can be seen in this view that a protrusion 8 which in the flow direction D extends across a width of the rear vertical flange 6 of the rear casing segment 4 is configured on the front vertical flange 7 of the front casing segment 3. The protrusion 8 on an external side 9 that faces away from the turbine longitudinal axis 2 (cf. FIG. 1) has a groove 11 in which a seal ring 12 of a sealing device 10 is disposed and fixed. The seal ring 12 extends in the radial direction R and contacts the rear vertical flange 6. A vertical separating joint between the front vertical flange 7 and the rear vertical flange 6 is thus sealed in relation to an interior of the turbine casing 1. According to the invention, a plurality of seal rings 12 can also be provided.

Figure 3:
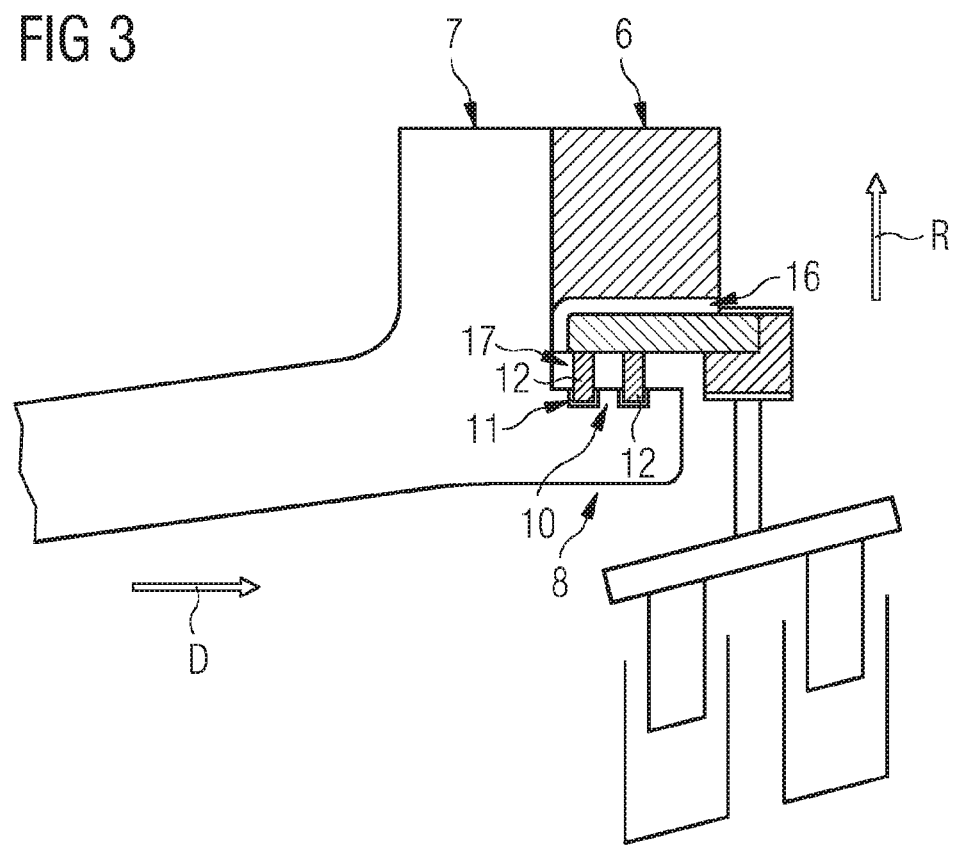
FIG. 3 in the longitudinal shows an enlarged fragment of a second embodiment of a turbine casing according to the invention.

FIG. 3 schematically shows an enlarged fragment of a second embodiment of a turbine casing 1 according to the invention. In this second embodiment, a bore 16 which runs parallel to the flow direction D and opens into an intermediate space 17 is configured, said intermediate space 17 being configured between the sealing device 10 and the front vertical flange 7. Operating fluid which has made its way past the sealing device 10 can be discharged by way of the bore 16. A further end of the bore 16 opens into the second interior region 18b of the rear casing segment 4. The sealing device 10 in this example has two seal rings 12 which are in each case disposed in a groove 11 of the external side 9 of the protrusion 8. According to the invention, one or a plurality of seal rings 12 can be provided.

Figure 4:
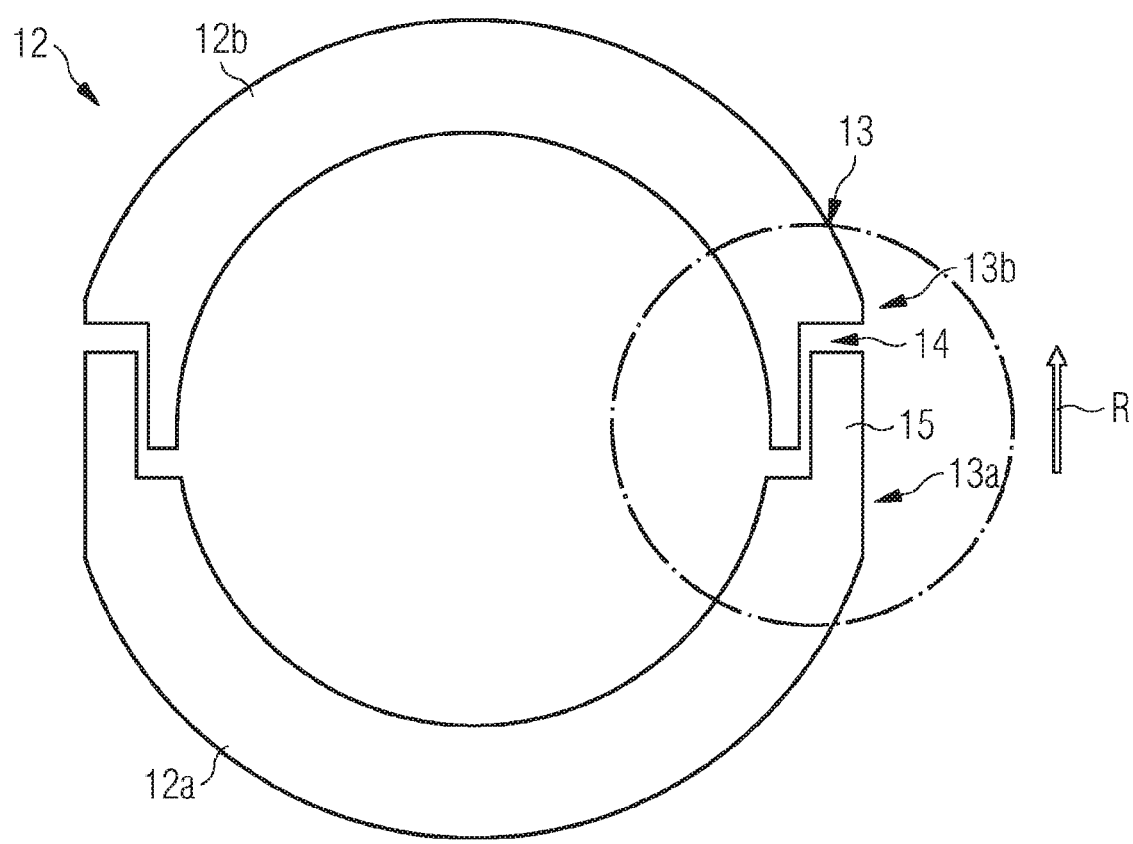
FIG. 4 in a plan view shows an example seal ring.
Figure 5:
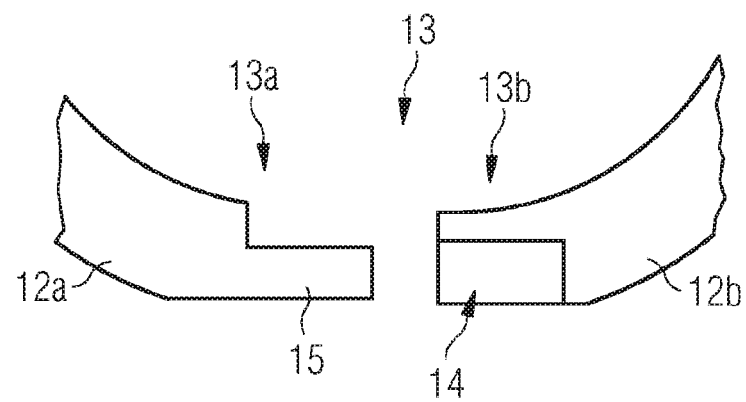
FIG. 5 shows an enlarged fragment of end regions of the seal ring from FIG. 4.

FIG. 4 and FIG. 5 show an example seal ring 12, or a fragment of the seal ring 12, respectively, in a plan view in the flow direction D. The seal ring 12 has a first ring segment 12a as well as the second ring segment 12b said ring segments 12a, 12b in end regions 13 being connected, or being capable of being connected, respectively to one another while configuring a gas-tight joint. A first end region 13a of the first ring segment 12a has a tongue 15 which is configured for engaging in a form-fitting manner in a recess 14 of a second end region 13b of the second ring segment 12b.

LIST OF REFERENCE SIGNS

1 Turbine casing
2 Turbine longitudinal axis
3 Front casing segment
3a First front casing sub-segment
3b Second front casing sub-segment
4 Rear casing segment
4a First rear casing segment
4b Second rear casing segment
5 Split cross joint
6 Rear vertical flange
7 Front vertical flange
8 Protrusion
9 External side
10 Sealing device
11 Groove
12 Seal ring
12a First ring segment
12b Second ring segment
13 End region
13a First end region
13b Second end region
14 Recess
15 Tongue
16 Bore
17 Intermediate space
18a First interior region
18b Second interior region
19 High-pressure turbine casing
19a High-pressure turbine casing lower part
19b High-pressure turbine casing upper part
20 Exhaust steam casing
20a Exhaust steam casing lower part
20b Exhaust steam casing upper part
D Flow direction
R Radial direction

The invention claimed is:

1. A turbine casing for a turbine or a steam turbine, comprising:
a front casing segment, configured about a turbine longitudinal axis, having a first front casing sub-segment as well as a second front casing sub-segment, and
a rear casing segment, configured about the turbine longitudinal axis, having a first rear casing sub-segment as well as a second rear casing sub-segment, wherein the rear casing segment in a flow direction is disposed behind the front casing segment, a split cross joint is configured wherein a rear vertical flange of the rear casing segment is fastened to a front vertical flange of the front casing segment,
a protrusion on the front casing segment surrounds the turbine longitudinal axis and is configured in a region of the front vertical flange, said protrusion extending parallel to the turbine longitudinal axis and in the flow direction protruding beyond the front vertical flange,
wherein an encircling sealing device, which seals the protrusion in relation to the rear casing segment, is disposed on an external side of the protrusion that faces away from the turbine longitudinal axis,
wherein the protrusion is configured so as to be hollow-cylindrical or hollow-conical.

2. The turbine casing as claimed in claim 1, wherein the sealing device is disposed and configured in such a manner so as to seal the protrusion in relation to the rear vertical flange.

3. The turbine casing as claimed in claim 1,
wherein at least one encircling groove is configured in the external side of the protrusion,
wherein the sealing device has at least one seal ring which has at least one first ring segment and one second ring segment, and
wherein the at least one seal ring is at least partially received in the at least one groove and in a sealing manner, contacts the rear casing segment in a radial direction in terms of the turbine longitudinal axis.

4. The turbine casing as claimed in claim 3, wherein the at least one first ring segment and the at least one second ring segment are configured as a gas-tight joint and have end regions that at least partially mutually overlap in a circumferential direction.

5. The turbine casing as claimed in claim 4,
wherein at least one first end region of the at least one first ring segment has at least one recess that is configured in the circumferential direction, and at least one second end region of the at least one second ring segment has at least one tongue that projects in the circumferential direction, and
wherein the at least one tongue is configured for engaging in a form fitting manner in the at least one recess.

6. The turbine casing as claimed in claim 3, wherein the at least one seal ring has a ring external diameter which at least in a destressed state, is larger than a rear casing segment internal diameter of the rear casing segment.

7. The turbine casing as claimed in claim 1, wherein a bore which fluidically connects an intermediate space, which is configured between the sealing device and the front vertical flange, to a second interior region of the rear casing segment configured in the rear vertical flange, wherein the second interior region, with respect to the flow direction, is disposed behind a first interior region of the rear casing segment that is directly adjacent to the front casing segment.

8. The turbine casing as claimed in claim 1, wherein the first front casing sub-segment is configured as a high-pressure turbine casing lower part of a high-pressure turbine casing of the turbine casing, the second front casing sub-segment is configured as a high-pressure turbine casing upper part of the high-pressure turbine casing, the first rear casing sub-segment is configured as an exhaust steam casing lower part of an exhaust steam casing of the turbine casing, and the second rear casing sub-segment is configured as an exhaust steam casing upper part of the exhaust steam casing.

9. A method for assembling a turbine having the turbine casing as claimed in claim 8, the method comprising:
inserting a first ring segment of a seal ring of the sealing device into a groove of the protrusion of the high-pressure turbine casing lower part;
connecting the high-pressure turbine casing lower part to the exhaust steam casing lower part so as to form a casing lower part;
inserting a second ring segment of the seal ring into the groove of the protrusion of the high-pressure turbine casing upper part;
connecting the high-pressure turbine casing upper part to the exhaust steam casing upper part so as to form a casing upper part; and
depositing the casing upper part onto the casing lower part.

* * * * *